United States Patent Office 3,455,473
Patented July 15, 1969

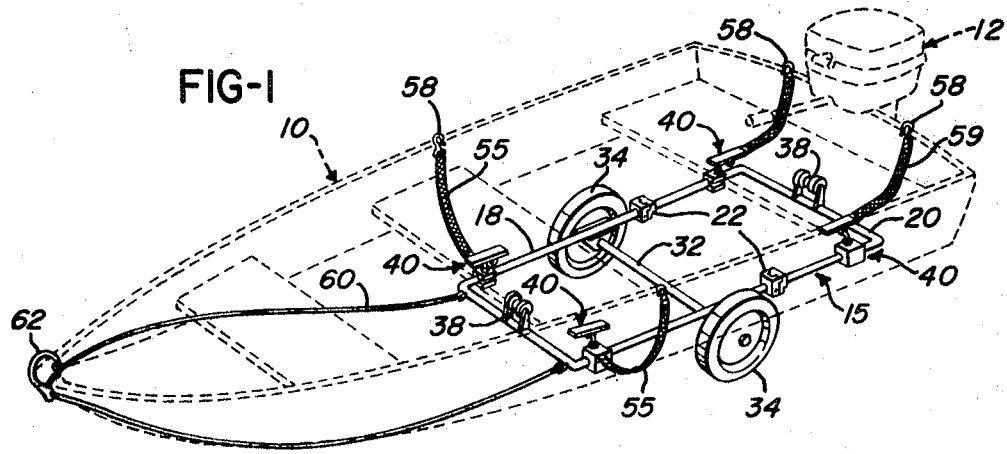
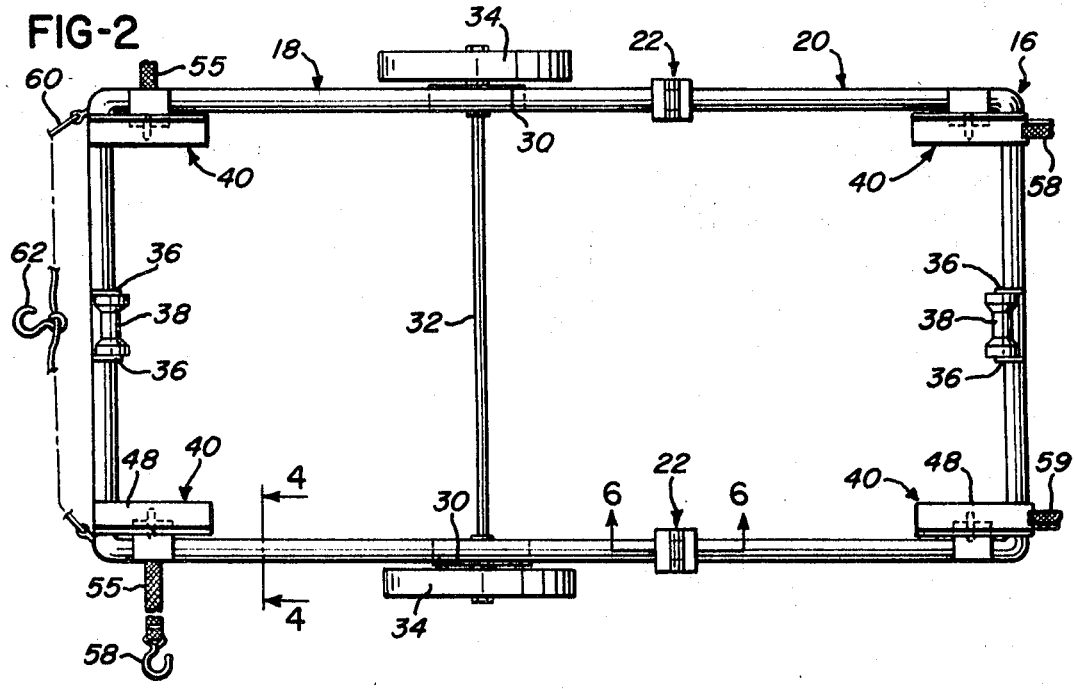
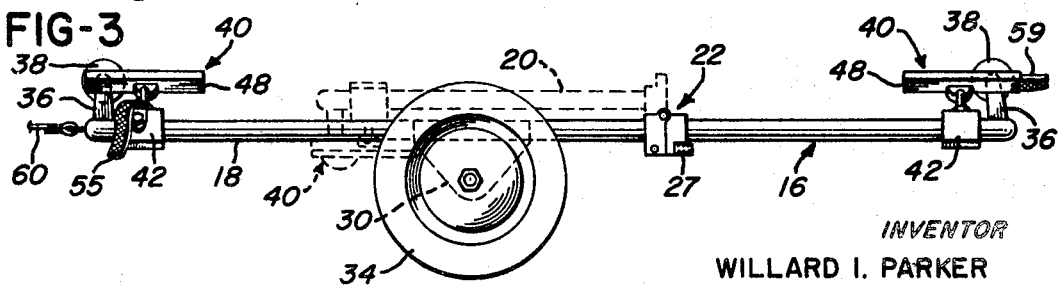

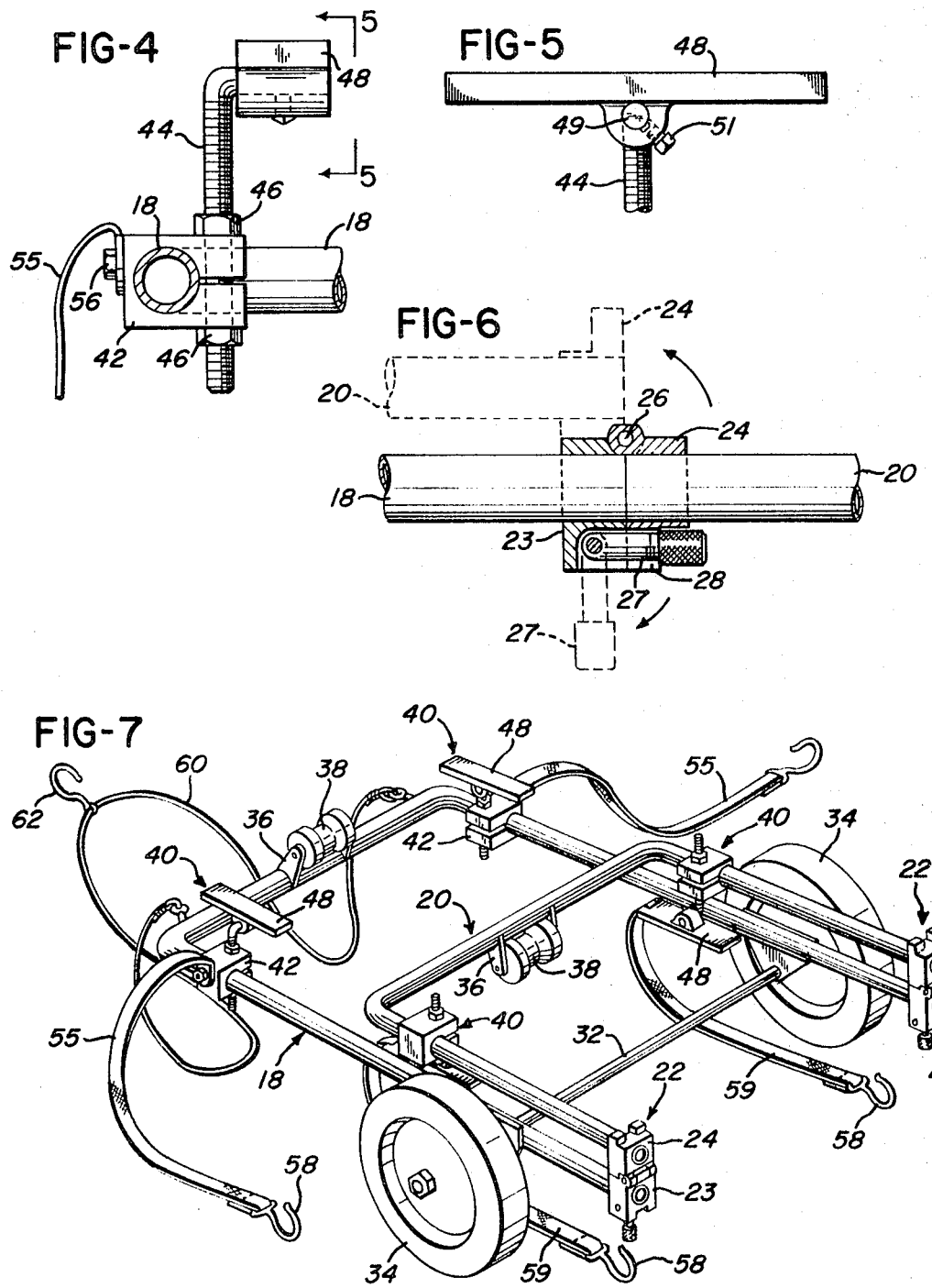

3,455,473
BOAT DOLLY
Willard I. Parker, 335 Henry St.,
Urbana, Ohio 43078
Filed Nov. 25, 1968, Ser. No. 778,693
Int. Cl. B60p *3/10*
U.S. Cl. 214—84                    7 Claims

ABSTRACT OF THE DISCLOSURE

A fishing boat is transported by a dolly including a generally rectangular frame having one end section which folds into the opposite end section supported by a pair of wheels. A keel roller is mounted on each end of the frame, a universally adjustable stabilizing support is mounted on each corner of the frame, and a plurality of straps secure the supports to the bottom surface of the boat after the dolly is positioned with the aid of a cord extending from the forward end of the frame and engaging the bow of the boat.

Background of the invention

To facilitate transporting a lightweight car top fishing boat, for example, between a car parking area and the bank of a lake or river, it is frequently desirable to use a dolly which attaches to the boat, especially when one person intends to transport the boat. Preferably, the dolly should be of lightweight construction and collapsible into a compact space so that it can be conveniently stored when not in use. It is also helpful to have the dolly positioned slightly rearward of the center of gravity of the boat and constructed to support the boat right side up so that the stern of the boat may be loaded with fishing gear and/or a lightweight outboard motor for transport along with the boat between the parking area and the waters edge.

It is also important for a lightweight boat dolly to provide for conveniently launching a boat loaded with fishing gear and/or a motor into the water as well as for retrieving the loaded boat from the water. While many forms of boat dollies have been constructed, none of the dollies provide all of the features mentioned above. For example, some of the dollies require that the boat be inverted when being transported by the dolly thus requiring that separate trips be made to transport fishing gear and/or an outboard motor. Other dollies require that the boat be lifted from the dolly when launching the boat into the water and be lifted from the water's edge onto the dolly when retrieving the boat. This means that the boat must first be unloaded of fishing gear and motor. Still other dollies require that the boat be balanced both laterally and longitudinally during transport thus making it difficult for one person to transport the boat, especially when loaded with fishing gear.

Summary of the invention

The present invention is directed to an improved lightweight boat dolly which provides all of the desirable features mentioned above, that is, a dolly which is collapsible into a compact space, provides for convenient launching and retrieving of a loaded boat, and for transporting the boat in an upright position for carrying fishing gear within the stern of the boat. In addition the dolly provides for accommodating fishing boats and other small boats of various sizes and configurations.

In accordance with a preferred embodiment, the boat dolly includes a rectangular tubular frame of circular cross section and formed of two U-shaped end sections hinged together so that the rear section may be folded over into the front section which is supported by a pair of wheels. A keel roller is mounted on each end of the frame, and a universally adjustable stabilizing support is mounted on each corner of the frame for engaging the bottom surface of the boat. The boat is secured to the dolly by a set of flexible straps, and a flexible cord or line is connected to the forward end of the dolly and carries a hook which attaches to the bow of the boat to provide for conveniently locating the boat on the dolly when the boat is retrieved from the water.

Brief description of the drawings

FIG. 1 is a perspective view of a boat dolly constructed in accordance with the invention and illustrating its position when attached to a typical fishing boat;

FIG. 2 is a plan view of the dolly shown in FIG. 1;

FIG. 3 is a side elevational view of the dolly shown in FIGS. 1 and 2 and illustrating its folded or collapsed position by dotted lines;

FIG. 4 is a fragmentary section taken generally on the line 4—4 of FIG. 2;

FIG. 5 is a fragmentary view taken generally on the line 5—5 of FIG. 4;

FIG. 6 is a fragmentary section taken generally on the line 6—6 of FIG. 2; and

FIG. 7 is a perspective view of the boat dolly shown in its folded or collapsed position.

Description of the preferred embodiment

Referring to the drawings, FIG. 1 shows a typical fishing boat 10 commonly having a twelve or fourteen foot length and a semi-V or flat bottom. Usually, the boat is equipped with a set of oars (not shown), but may also be equipped with a small outboard motor 12. In accordance with the invention, the boat 10 is supported by a small lightweight dolly 15 including a rectangular frame 16 having outer dimensions of approximately 2' x 4'. The frame 16 consists of a forward U-shaped section 18 and a rearward U-shaped section 20 each formed of aluminum tubing of circular cross-section.

A pair of hinges 22 connect the sections 18 and 20, and each hinge 22 includes a set of hinge blocks 23 and 24 (FIG. 6) pivotally connected by a pin 26. The hinge blocks 23 are secured to the ends of the frame sections 18, and each block 23 carries a swing bolt 27 adapted to be received within a slot 28 formed within the adjacent hinge block 24 rigidly secured to the opposing end of the frame section 20.

A pair of generally triangular plates 30 (FIGS. 2 and 3) are secured to the legs or sides of the frame section 18 and support a laterally extending axle 32. A pair of rubber tire wheels 34 are mounted on the end portions of the axles 32 outboard of the frame 16. A pair of parallel spaced ears 36 project upwardly from each end of the frame 16 and support a roller 38 positioned for engaging the keel (not shown) on the bottom of the boat 10.

A set of four aluminum stabilizing supports 40 are mounted on the corners of the frame 16, and each support 40 includes a clamping block 42 (FIG. 4) having a cylindrical bore for receiving the adjacent tubular leg of the frame section 18 or 20. An L-shaped bolt 44 extends through a hole formed within each block 42 at right angles to the adjacent frame leg, and a pair of nuts 46 are mounted on the bolt 44 on opposite sides of the block 42 to secure the clamping block 42 rigidly to the leg in a predetermined position. A support pad 48 is pivotally mounted on the head 49 of each bolt 44 and is locked by a set screw 51.

As shown in FIG. 3, the pads 48 project above the wheels 34 to permit the bottom of the boat 10 to extend laterally outboard of the wheels. The supports 40 are also offset inwardly on each frame section so that when the frame sections are folded (FIG. 7), the supports on the rear section 20 are positioned between the sides of the forward section 18. In place of the clamping blocks 42, each bolt 44 may be supported by an angle bracket which is rotatably attached to the adjacent leg of the frame 16 by a pair of U bolts.

Referring to FIGS. 1 and 7, a pair of flexible straps 55 each have one end secured by a screw 56 to the clamping block 42 of a forward support 40, and a hook 58 is adjustably attached to the opposite end of each strap 55. Another pair of straps 59 each has one end connected to an adjustable hook 58, and the opposite end secured to one of the rear support pads 48. A flexible line or cord 60, formed of a material such as a nylon rope, extends from the forward corners of the frame 16 to a hook 62 which is adapted to be attached to the forward end of the boat.

After the boat 10 is transported in an inverted position on a set of car top racks to a parking area for a fishing site, the boat dolly 15 of the invention is preferably used in the following manner. The boat 10 is removed from the car top racks, preferably with the aid of a conventional rear bumper swivel post, and the boat is positioned in an inverted position on the ground. The dolly 15 is placed on the bottom surface of the boat and is positioned longitudinally with the aid of the line 60 and hook 62 attached to the bow of the boat. The side straps 55 are hooked to the sides or gunwales of the boat, and the rear straps 59 are hooked to the rear transom of the boat or to handles mounted on the rear transom. After each strap 55 and 59 is tightened with the aid of a suitable buckle (not shown) the combined dolly and boat are rolled over until the wheels 34 of the dolly rest on the ground.

The desired fishing gear is loaded into the stern of the boat 10, and the motor 12 is mounted on the rear transom. The length of the flexible line 60 is selected to provide a substantially balanced condition according to the normal load of fishing gear and the weight of the motor 12. The assembled boat and dolly are then pulled or pushed to the waters edge where the wheels 34 are blocked and the straps 55 and 59 are released. The loaded boat is then rolled off the dolly on the keel rollers 38 and into the water.

When it is desired to retrieve the boat 10 from the water, the dolly 15 is positioned adjacent the waters edge, and the wheels 34 are again blocked. The hook 62 is attached to the bow, and the loaded boat is then pulled onto the dolly 15, with the keel engaging the rollers 38, until the line 60 becomes taut indicating that the dolly 15 is properly positioned on the bottom surface of the boat. The side straps 55 and the rear straps 59 are attached to the boat, and the combined boat and dolly are pulled to the car where the boat is unloaded. While the dolly 15 may remain attached to the bottom of the boat 10 when the boat is loaded in an inverted position onto the car top carrying racks and be transported with the boat, the dolly 15 may be easily removed from the boat 10 and folded into its collapsed position shown in FIG. 7 after the bolts 27 are released.

From the drawings and the above description, it becomes apparent that a boat dolly constructed in accordance with the invention provides each of the above mentioned desirable features and advantages. That is, the folding aluminum frame 16 and the aluminum supports 40 provide a lightweight and compact structure which can be easily stored in a small space, as for example, within an automobile trunk. The flexible bow line 60 assures proper positioning of the dolly 15 on the bottom surface of the boat and cooperates with the straps 55 and 59 to prevent slipping of the boat on the dolly while the boat is being transported. The keel rollers 38 provide the feature of convenient launching and retrieving of a loaded boat, and the universally adjustable stabilizing supports 40 cooperate with the keel rollers 38 to provide positive mounting of the dolly 15 on the boat 10.

While the form of apparatus herein described constitutes a preferred embodiment of the invention, it is to be understood that the invention is not limtied to this precise form of apparatus, and that changes may be made therein without departing from the scope of the invention.

What is claimed is:

1. An improved dolly for transporting a boat and adapted to facilitate launching and retrieving the boat at the waters edge, comprising a generally rectangular frame including a forward section and a rearward section, a pair of laterally spaced wheels mounted on one of said sections, a roller member mounted on each end of said frame and positioned to engage a boat keel, a plurality of stabilizing supports mounted on said frame, means for positioning each said support for engaging the bottom surface of the boat, means for securing said frame and said supports to the bottom surface of the boat, and hinge means connecting said forward and rearward sections of said frame for folding said sections together into a compact space for convenient storage.

2. A dolly as defined in claim 1 wherein each section of said frame has portions of circular cross-sectional configuration, and each said stabilizing support includes a clamping member rotatably mounted on one of said portions of said frame.

3. A dolly as defined in claim 2 including an L-shaped bolt secured to each said clamping member, and a support pad adjustably mounted on said bolt for rotation on an axis substantially normal to a plane extending through the adjacent said portion of said frame.

4. A dolly as defined in claim 1 including a flexible line connected to said forward section of said frame, and means secured to said line for engaging the bow of the boat to assure predetermined positioning of said dolly on the boat to facilitate retrieving of the boat from the water.

5. A dolly as defined in claim 1 wherein said stabilizing supports extend above said wheels to permit the bottom surface of the boat to extend outboard of said wheels.

6. A dolly as defined in claim 1 including lock means associated with each said hinge for securing said forward and rearward sections of said frame in an extended relationship.

7. A dolly as defined in claim 1 wherein each said section of said frame has a generally U-shaped configuration with one of said sections being larger than the other, said wheels mounted on the larger said section, a pair of said stabilizing supports on each said section, and said supports on the smaller said section being offset inwardly relative to the larger said section so that said stabilizing supports on the smaller said section are located with the larger said section when said frame is folded.

References Cited

UNITED STATES PATENTS 3,057,492   10/1962   Chrystler _____ 280—414 XR

FOREIGN PATENTS 242,250   12/1962   Australia.

ALBERT J. MAKAY, Primary Examiner

U.S. Cl. X.R.

280—34, 414